Figure 1:
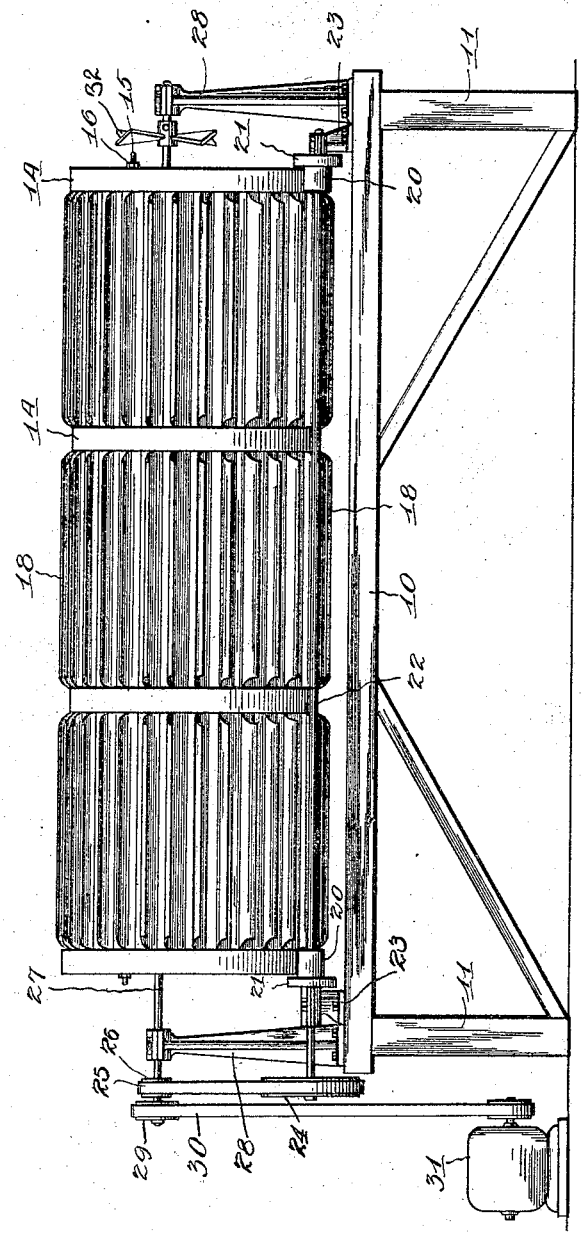

July 8, 1924.

F. L. WEBSTER 1,500,974

MACHINE FOR DRYING FRUIT AND VEGETABLES

Filed Oct. 23, 1922    3 Sheets-Sheet 1

Inventor,
Fred L. Webster.

By Knight Bro
Attorneys

July 8, 1924.  
F. L. WEBSTER  
MACHINE FOR DRYING FRUIT AND VEGETABLES  
Filed Oct. 23, 1922   3 Sheets-Sheet 2

1,500,974

Inventor,  
Fred L. Webster.

By Knight & Bros.

Attorneys

July 8, 1924.

F. L. WEBSTER 1,500,974

MACHINE FOR DRYING FRUIT AND VEGETABLES

Filed Oct. 23, 1922   3 Sheets-Sheet 3

Inventor,
Fred L. Webster.

By Knight Bro

Attorneys

Patented July 8, 1924.

1,500,974

UNITED STATES PATENT OFFICE.

FRED L. WEBSTER, OF ADAMS, NEW YORK.

MACHINE FOR DRYING FRUIT AND VEGETABLES.

Application filed October 23, 1922. Serial No. 596,403.

*To all whom it may concern:*

Be it known that I, FRED L. WEBSTER, a citizen of the United States, and a resident of Adams, in the county of Jefferson and State of New York, have invented certain new and useful Improvements in a Machine for Drying Fruit and Vegetables, of which the following is a specification.

My invention relates to an improvement in a fruit and vegetable drier and particularly to a device of this character in which the fruit or vegetables are subjected to a current of drying air while passing through the drying cylinder.

The construction of my improved drier is such that any type of fruit or vegetable may be dried with equal facility thus materially increasing the efficiency and usefulness of the device.

Another object of the invention is to so construct the drier that numerous air currents will be directed against the fruit or vegetables during the drying operation, these air currents being furnished without the necessity of providing complicated and expensive machinery for furnishing such drying air.

Figure 2:
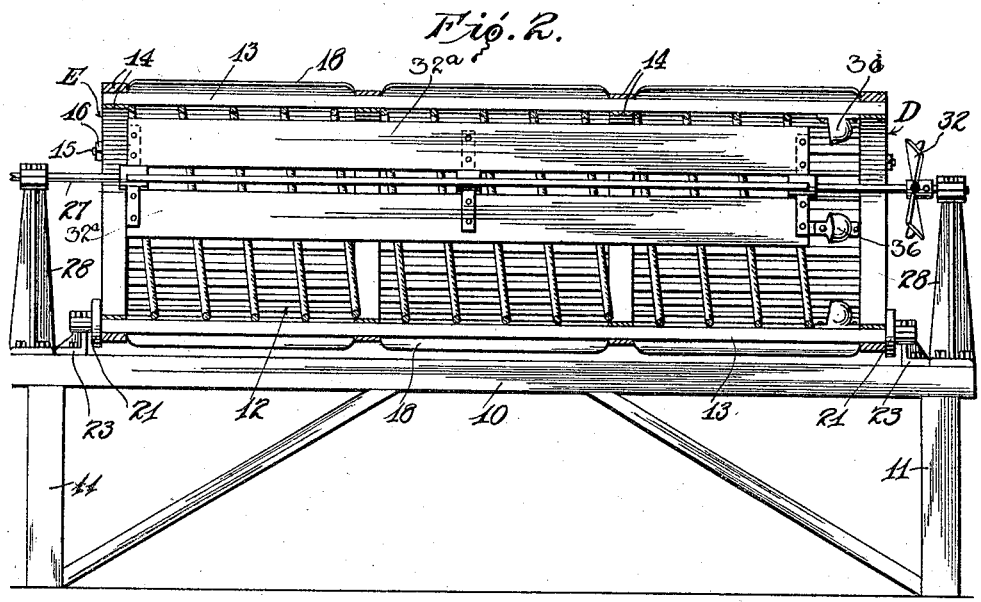
Figure 3:
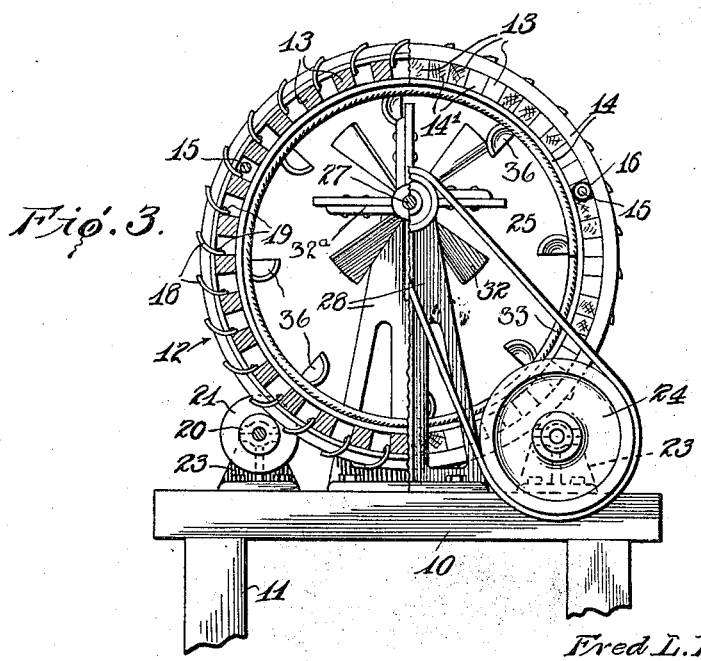
Figure 4:
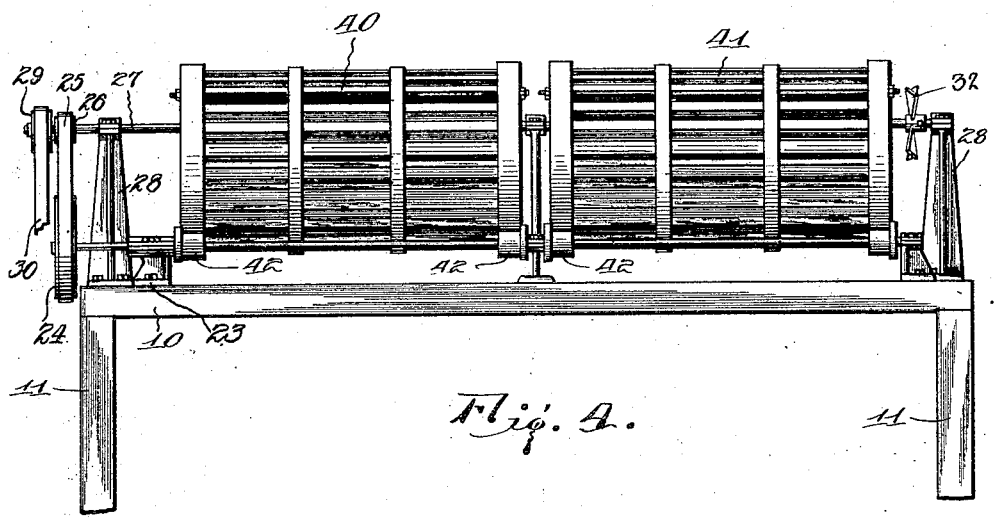
Figures 5, 6:
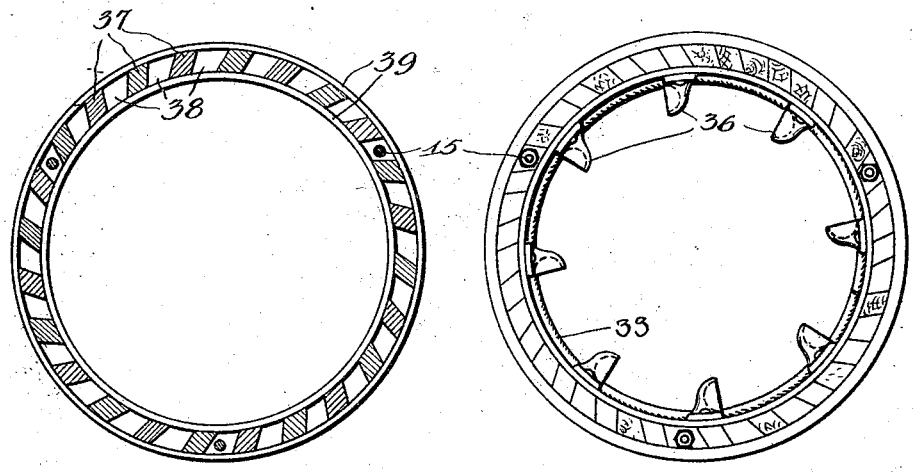

With these objects in mind, the invention consists in the novel combination, construction and arrangement of parts more fully hereinafter described and illustrated in the accompanying specification and drawings:

In the drawings:

Fig. 1 is a side elevation of a drier construction in accordance with this invention, Fig. 2 is a central longitudinal section through the machine, Fig. 3 is a view partly in section and partly in end elevation, Fig. 4 is a side elevation of a modification of the machine, Fig. 5 is a fragmentary transverse section of the drying cylinder illustrating a modified form of construction, and Fig. 6 is an end elevation of the drying cylinder illustrating an alternative structure.

Referring now more particularly to Figs. 1 to 3 wherein like reference characters indicate like parts, it will be noted that there is provided a base or supporting frame 10 mounted upon suitable legs 11.

The drying chamber is in the form of an elongated cylinder 12 open at both ends, the end E being preferably the entrance and the end D the discharge end. The fruit is adapted to enter at the end E and to travel through the cylinder and to be discharged at the end D. The cylinder is composed of a plurality of staves or longitudinally extending pieces 13 held together by pairs of hoops or binding bands 14, each pair of bands 14 being concentrically arranged thereby providing a circular slot through which the staves 13 extend. Arranged between the staves 13 at each end of the cylinder are a plurality of wedges or spacing blocks 14' for spacing the staves 13 throughout the cylinder length. These wedges or spacing blocks are of such dimensions as to be contained between the two end pairs of bands 14. For tying the cylinder together there is provided a plurality of tie-rods 15 extending longitudinally of the cylinder and between the bands 14, nuts 16 being threaded on the ends of these rods and bearing against the end hoops 14.

By spacing the longitudinal staves 13, there is provided a plurality of longitudinally extending slots or openings 17 for the entrance of air to the interior of the cylinder for the purpose of drying the fruit. In order to trap and direct air through these openings to the interior of the cylinder there is provided a plurality of curved, air deflecting wings or blades 18 secured to the staves 13 as at 19. These flanges or blades are inclined at an angle of approximately 45° with reference to the cylinder surface and by this construction when the cylinder is rotated, air will be caught by these blades or flanges and directed through the adjacent openings 17 to the interior of the cylinder and against the fruit or vegetables passing therethrough.

For revolubly mounting the drying cylinder there is provided two pairs of rollers 20 provided with flanges 21 and revolubly mounted on longitudinally extending shafts 22 the ends of which are journalled in supporting brackets 23. The cylinder bears with its end bands 14 on the rollers 20, the flanges 21 preventing a longitudinal displacement of the cylinder. For the purpose of insuring the proper mounting of the cylinder the outer band 14 at each end of the cylinder is preferably thickened as illustrated clearly in Fig. 2.

Power is supplied to one of the shafts 22 through the medium of a pulley 24 and a belt 25 which passes over a pulley 26 secured to a shaft 27 which extends through the cylinder 12. This shaft 27 is journalled in supporting brackets 28 arranged at both ends of the base 10. A second pulley 29 fixed to the shaft 27 is engaged by a belt 30 which connects the shaft 27 to a suitable source of power 31, such as an electric motor or the like. When the power is set in motion the shaft 27 and the shaft 22 will be both rotated as will be obvious and by reason of this rotation the cylinder will revolve on the sets of rollers 20.

The shaft 27 is a fan shaft and carries on one end a suction fan 32, which, when the shaft 27 is rotated, creates a suction or draft through the cylinder and assists the air deflecting blades 18 in subjecting the fruit or vegetables to drying air.

Also mounted on the shaft 27 is a four-bladed fan 32ª which extends longitudinally through the cylinder and a short distance from the discharge end D. This fan also assists in creating currents of air which dry the fruit and vegetables traveling through the cylinder.

For causing the fruit to travel longitudinally through the cylinder when the same is rotated there is provided a spiral guiding member 33 formed preferably of rope, rubber or other soft material so as not to bruise or mar the fruit. The purpose of this guiding member is to cause the fruit fed into the end E of the cylinder to travel longitudinally therethrough.

From the foregoing it will be obvious that when the machine is set in motion the fruit and vegetables introduced through the end E thereof will be caused to traverse the cylinder toward the discharge end D. During their travel through the cylinder they will be subject to a multiplicity of currents of air which are trapped by the air deflecting blades 18 and injected into the drying cylinder through the openings 17. The production of these currents of air is insured and their force and volume increased by the suction set up by the fan 32 and by the fan 32ª. Therefore as the fruit and vegetables reach the discharge end D the moisture originally contained thereon will be evaporated and they will be discharged in a dried condition.

Arranged adjacent the discharge end of the cylinder is a plurality of elevator buckets 36. The spiral member 33 stops adjacent these buckets and the fruit or vegetables which have travelled through the cylinder will be caught by these buckets and may thereupon be discharged into a chute or conveyor and fed to a polisher for instance, thus making the next step in the treatment of the fruit or vegetables a continuous operation.

In Figs. 5 and 6 there is illustrated a modified form of drying cylinder. In this form there is provided a plurality of staves 37 angularly arranged relatively to the surface of the cylinder, these staves being spaced to provide a plurality of longitudinally extending openings or slots 38 as in the first form of this invention described. Pairs of hoops or bands 39 as noted previously, will be employed for holding the staves in position to form the cylinder. In this form of construction the air deflecting blades 18 are eliminated and the air is deflected into the interior of the cylinder by reason of the angular pitch of the staves 37. In all other respects the construction of the machine is similar to that previously described.

In Fig. 4 there is illustrated a construction of machine wherein the drying cylinder is shown as formed in two sections 40 and 41. In this construction four pairs of guiding rollers 42 are provided, but in other respects, the structure remains identical with that of the structure first described. This arrangement suggests the possibility of making the machine any desired length so that greater amounts of fruit and vegetables may be dried if desired.

From the foregoing it will be obvious that there is provided a practical and efficient drier for fruit and vegetables which is simple in construction and may be durably and cheaply manufactured. By employing currents of air supplied mainly by the air deflecting means mounted on the cylinder, the cost of maintenance and operation of the machine is reduced to a minimum. It will be obvious furthermore that because of the constructional arrangement the cylinder may be disassembled and new staves or other parts replaced should the same become worn or broken.

While the structures illustrated and described have been found to be efficient and practical in every respect it is not intended that this invention be unnecessarily limited but reservation is made to make such changes in details of construction as may come within the purview of the accompanying claims.

Having thus described my invention, what is claimed is:

1. A device of the class described comprising a revolubly mounted drying cylinder, a conveying spiral arranged in said cylinder, means for rotating said cylinder and means for deflecting air to the interior of said cylinder during its rotation.

2. In an arrangement of the class described a rotatable drying cylinder, a conveying spiral arranged in said cylinder, means carried by said cylinder for directing air to the interior thereof during rotation and means for rotating said cylinder.

3. In a fruit and vegetable drier of the class described a drying cylinder provided with a plurality of openings, means carried by said cylinder for directing air to the interior of said cylinder during its rotation, a conveying spiral arranged in said cylinder and means for rotating said cylinder.

4. In a drying device of the class described a drying cylinder, means rotatably mounting said drying cylinder, said cylinder being formed with a plurality of longitudinal openings, air deflecting means arranged on said cylinder adjacent said openings for directing air through said openings to the interior of said cylinder during its rotation, conveying means in said cylinder and means for rotating said cylinder.

5. In a drying device of the class described a drying cylinder, means rotatably mounting said drying cylinder, said cylinder being formed with a plurality of longitudinal openings, air deflecting means arranged on said cylinder adjacent said openings for directing air through said openings to the interior of said cylinder during its rotation, a conveying spiral arranged in said cylinder and means for rotating said cylinder.

6. In an arrangement of the class described, a drying cylinder comprising a plurality of longitudinally arranged spaced staves, a plurality of pairs of securing bands for maintaining said staves in place, air deflecting blades mounted on the exterior of said cylinder for directing air during the rotation of said cylinder through the openings between said staves and means for rotating said cylinder.

7. In a drying device of the class described, a drying cylinder, air deflecting blades mounted on the exterior of said cylinder for directing air to the interior of the cylinder during its rotation, conveying spirals arranged in said cylinder, elevator buckets arranged adjacent said cylinder end and means for rotating said cylinder.

8. In a drying device of the class described, a rotatably mounted drying cylinder, means carried by said cylinder for directing air to the interior thereof during rotation of said cylinder, a suction fan arranged adjacent the discharge end of said cylinder and means for rotating said fan and cylinder.

9. In a drier for fruit and vegetables, a drying cylinder rotatably mounted and provided with a plurality of openings, air deflecting members carried by said cylinder and adapted to deflect air through said openings to the interior of said cylinder during its rotation, a fan arranged adjacent one end of said cylinder and means for rotating said cylinder and fan.

10. A fruit and vegetable drying machine of the class described comprising a base, a drying cylinder, a plurality of rollers for revolubly supporting said drying cylinder, flanges formed on said rollers to prevent axial displacement of said cylinder, said cylinder comprising a plurality of spaced staves, spaced pairs of bands for securing said staves together, spacing blocks for spacing said staves, air deflecting wings secured to said staves for directing air between said staves to the interior of the cylinder during rotation of the same, a conveying spiral disposed within said cylinder, a fan shaft extending therethrough, a fan secured to said shaft adjacent one end of said cylinder and means for connecting said rollers and said fan shaft to a source of power whereby the same may be simultaneosuly rotated.

FRED L. WEBSTER.